United States Patent
Breckwoldt et al.

(10) Patent No.: US 10,494,303 B2
(45) Date of Patent: Dec. 3, 2019

(54) GYPSUM COMPOSITIONS CONTAINING CROSSLINKED CELLULOSE ETHERS FOR MORTARS WITH REDUCED STICKINESS

(71) Applicant: DOW GLOBAL TECHNOLOGIES LLC, Midland, MI (US)

(72) Inventors: Joern Breckwoldt, Hamburg (DE); Alexandra Hild, Soltau (DE); Anette Wagner, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 125 days.

(21) Appl. No.: 15/567,260

(22) PCT Filed: Jun. 29, 2016

(86) PCT No.: PCT/US2016/039957
§ 371 (c)(1),
(2) Date: Oct. 17, 2017

(87) PCT Pub. No.: WO2017/004120
PCT Pub. Date: Jan. 5, 2017

(65) Prior Publication Data
US 2018/0134621 A1    May 17, 2018

Related U.S. Application Data

(60) Provisional application No. 62/186,639, filed on Jun. 30, 2015.

(51) Int. Cl.
*C04B 28/14* (2006.01)
*C04B 24/38* (2006.01)
*C04B 103/20* (2006.01)
*C04B 111/00* (2006.01)

(52) U.S. Cl.
CPC .......... *C04B 28/143* (2013.01); *C04B 24/386* (2013.01); *C04B 28/14* (2013.01); *C04B 2103/20* (2013.01); *C04B 2111/00482* (2013.01); *C04B 2111/00637* (2013.01)

(58) Field of Classification Search
CPC ..... C04B 24/383; C04B 24/386; C04B 28/14; C04B 28/143
See application file for complete search history.

(56) References Cited

U.S. PATENT DOCUMENTS

| 5,277,712 A | 1/1994 | McInnis |
| 7,041,168 B2 * | 5/2006 | Schlesiger ............ C04B 24/383 |
| | | 106/172.1 |
| 2004/0127700 A1 | 7/2004 | Schlesiger et al. |
| 2005/0241541 A1 | 11/2005 | Hohn et al. |
| 2006/0169183 A1 | 8/2006 | Waser |
| 2015/0144032 A1 | 5/2015 | Brush et al. |

FOREIGN PATENT DOCUMENTS

| CN | 101456686 | 6/2009 |
| DE | 3108904 | 1/1982 |
| EP | 0496682 | 7/1992 |
| EP | 2379560 | 1/2014 |
| GB | 2329895 | 4/1999 |
| GB | 2344341 | 6/2000 |
| WO | 2008151879 | 12/2008 |
| WO | 2009018876 | 2/2009 |

OTHER PUBLICATIONS

Baumann, R. et al., Controlling the application performance of cement renders with cellulose ethers, ZKG 4 2010, ZKG (Cement Lime Gypsum) International, Bauverlag BV, GmbH, Guterslöh, DE, pp. 68-75.

* cited by examiner

*Primary Examiner* — Michael P Wieczorek

(57) ABSTRACT

The present invention provides dry mix compositions for use in making gypsum plasters or mortars comprising gypsum, preferably, phosphorous gypsum one or more retarder, and one or more crosslinked cellulose ethers containing polyether groups. The compositions enable the provision of gypsum dry mixes, such as those from phosphorus gypsum, that make gypsum mortars with less stickiness while reducing the amount of cellulose ether in the dry mix.

10 Claims, No Drawings

GYPSUM COMPOSITIONS CONTAINING CROSSLINKED CELLULOSE ETHERS FOR MORTARS WITH REDUCED STICKINESS

The present invention relates to dry mix compositions comprising gypsum and cellulose ethers containing polyether groups and having enhanced gel strength for use in making gypsum plaster or mortar, as well as methods for using the compositions. In addition, the present invention provides methods of making crosslinked cellulose ethers by crosslinking at 90° C. or less, preferably, 60° C. or more, in an inert atmosphere a cellulose ether in the presence of a polyether group containing crosslinker.

Mortars from gypsum containing dry mix compositions have been widely used in Western Europe since the 1970s allowing for lower cost and highly efficient plaster application and made water soluble cellulose ethers a common additive in gypsum plasters. Cellulose ethers impart water retention properties that limit loss of water from the plaster to absorbing substrates and allowing for steady setting rate and high final strength. Additionally, the rheological profile of cellulose ethers may improve spray application and facilitate subsequent leveling and finishing steps. However, cellulose ethers pose drawbacks for gypsum containing plaster as they can create a tacky mortar, especially if a highly viscous cellulose ether is used. Where a gypsum base tends to be tacky by itself, such as is the case with phosphorous gypsum which has a fine particle size and is commonly used in Asia, the use of highly viscous cellulose ethers is unfeasible. Even with other gypsum materials, the addition rate of cellulose ether must be high (0.22-0.45 wt. %, based on total solids) to create sufficient water retention to retain a useful length of application time. On the other hand, such a high cellulose ether addition rate in any formulation leads to very high formulation costs.

US patent publication 2004/0127700A1, to Schlesiger et al. discloses crosslinked cellulose ethers having gel-like rheology as well as methods for making the cellulose ethers and then crosslinking them. The Schlesiger compositions behave in a manner in aqueous solution such that in the absence of shear, the composition does not flow, whereas it flows in the presence of such shear. The cellulose ether is crosslinked in an alkalized environment which can degrade the cellulose backbone of the cellulose ether.

The present invention seeks to solve the problems of providing gypsum containing compositions with cellulose ethers that form mortars without excessive stickiness or tack, even when using phosphorous gypsum.

STATEMENT OF THE INVENTION

1. In accordance with the present invention dry mix compositions for use in making gypsum plaster or mortar comprise gypsum, such as natural gypsum or synthetic gypsum, for example, phosphorous gypsum, one or more retarder, such as any chosen from a dicarboxylic acid, for example, tartaric acid, a polycarboxylic acid, e.g. citric acid, an amino acid, a water dispersible protein, a phosphate, such as tetrapotassium diphosphate, a phosphonate, a phosphonic acid, a borate, and mixtures thereof, and one or more crosslinked cellulose ethers containing polyether groups in the amount of from 0.1 to 0.4 wt. % of total solids, or, preferably 0.25 or less wt. % of total solids, which may be chosen from a low or medium viscosity crosslinked cellulose ether in an amount of from 0.1 to 0.4 wt. % of total solids, preferably, from 0.19 to 0.28 wt. % of total solids, and a high viscosity crosslinked cellulose ether in an amount of from 0.1 to 0.4 wt. % of total solids, or, 0.35 wt. % of total solids or less, or, preferably, from 0.13 to 0.22 wt. % of total solids.

2. In accordance with the dry mix compositions of item 1, above wherein the gypsum comprises from 20 to 100 wt. % or, preferably, from 30 to 95 wt. %, based on the total weight of gypsum solids, of a phosphorous gypsum that itself has a particle size distribution of from 65-75 wt. %<0.063 mm by air jet sieving, 5 min at a 2000 Pa (low) pressure.

3. In accordance with the dry mix compositions of any one of items 1, or 2, above, wherein the amount of the gypsum ranges from 60 to 99.7 wt. % of total solids in any composition other than a lime plaster and wherein, in lime plaster, the amount of the gypsum ranges from 40 to 96.7 wt. % of total solids and the amount of lime ranges from 3 to 20 wt. % of total solids.

4. In accordance with the dry mix compositions of any of items 1, 2, or 3, above, at least one of the one or more crosslinked cellulose ethers is a mixed cellulose ether that contains hydroxyalkyl groups and alkyl ether groups, such as those chosen from alkyl hydroxyethyl celluloses, e.g. hydroxyalkyl methylcelluloses, and is, preferably, chosen from hydroxyethyl methylcellulose (NEMC), hydroxypropyl methylcellulose (HPMC), methyl hydroxyethyl hydroxypropylcellulose (MHEHPC), and ethylhydroxyethyl cellulose (EHEC).

5. In accordance with the dry mix compositions of any one of items 1, 2, 3, or 4, above, wherein the polyether group in the crosslinked cellulose ethers is a polyoxyalkylene which has from 2 to 100 or, preferably, 2 to 20, or, more preferably, from 3 to 15 oxyalkylene groups.

6. In accordance with the dry mix compositions of any one of items 1, 2, 3, 4, or 5, above, wherein the polyether group in the crosslinked cellulose ethers is a polyoxyalkylene chosen a polyoxyethylene, a polyoxypropylenes and combinations thereof.

7. In accordance with the dry mix compositions of any one of items 1, 2, 3, 4 or 5, above, wherein the crosslinked cellulose ether is a polyoxypropylene group containing hydroxyethyl methylcellulose.

8. In accordance with the dry mix compositions of any one of items 1, 2, 3, 4, 5, 6, or 7, above, wherein the amount of the retarder ranges from 0.02 to 0.1 wt. % of total solids, preferably, from 0.040 to 0.060 wt. % of total solids.

9. In accordance with the dry mix compositions of any one of items 1, 2, 3, 4, 5, 6, 7, or 8, above, wherein the gypsum, preferably phosphorous gypsum, is a mixture of a hemihydrate of gypsum and multiphase gypsum and, such as a mixture of from 60 to 85 wt. %, preferably, from 70 to 80 wt. % of total solids, of a hemihydrate of gypsum, and from 15 to 40 wt. % of total solids, preferably 20 to 30 wt. % of multiphase gypsum, 10. In another aspect of the present invention, the present invention provides methods of using the dry mix compositions of any of items 1 to 9, above, comprising combining the dry mix composition with water or aqueous liquid to make a mortar and applying the mortar to a substrate and letting the applied mortar dry.

11. In yet another aspect of the present invention, the present invention provides methods of making polyether group containing crosslinked cellulose ethers by crosslinking at 90° C. or less, or, preferably, 60° C. or more, in an inert atmosphere, preferably, a nitrogen atmosphere, a cellulose ether in the presence of a polyether group containing crosslinking agent in an amount of from 0.0001 to 0.05 eq, or, preferably, from 0.0005 to 0.01 eq, or, more preferably, from 0.001 to 0.005 eq, to form a crosslinked polyether group containing cellulose ether, where the unit "eq" represents the molar ratio of moles of the respective crosslinking agent relative to the number of moles of anhydroglucose units (AGU) in the cellulose ether; and, granulating and drying the resulting crosslinked polyether group containing cellulose ether.

12. In accordance with the methods of item 11, above, wherein the polyether group containing crosslinking agent having two or more, preferably, two crosslinking groups chosen from halogen groups, glycidyl groups, epoxy groups, and ethylenically unsaturated groups, e.g. vinyl groups, that form ether bonds with the cellulose ether in crosslinking the cellulose ether, preferably, 1,2-dichloro (poly)alkoxy ethers, e.g. dichloropolyoxyethylene; diglycidyl polyalkoxy ethers, e.g. diglycidyl polyoxypropylene; glycidyl(poly)oxyalkyl methacrylate; diglycidyl phosphonates; or divinyl polyoxyalkylenes containing a sulphone group.

Unless otherwise indicated, all temperature and pressure units are room temperature and standard pressure (STP).

All phrases comprising parentheses denote either or both of the included parenthetical matter and its absence. For example, the phrase "(meth)acrylate" includes, in the alternative, acrylate and methacrylate.

All ranges recited are inclusive and combinable. For example, a disclosure of from 50 to 120° C. or, preferably, from 60 to 100° C. will include all of from 50 to 120° C., from 50 to 60° C., from 60 to 120° C., from 100 to 120° C., from 50 to 100° C. or, preferably, from 60 to 100° C.

As used herein the term "aqueous" means that the continuous phase or medium is water and from 0 to 10 wt. %, by weight based on the weight of the medium, of water-miscible compound(s). Preferably, "aqueous" means water.

As used herein, the phrase "based on total solids" refers to weight amounts of any given ingredient in comparison to the total weight amount of all of the non-volatile ingredients in the aqueous composition, including synthetic polymers, cellulose ethers, acids, defoamers, hydraulic cement, fillers, other inorganic materials, and other non-volatile additives. Water, ammonia and volatile solvents are not considered solids.

As used herein the term "DIN EN" refers to a English language version of a German materials specification, published by Beuth Verlag GmbH, Berlin, DE (Alleinverkauf). And, as used herein, the term "DIN" refers to the German language version of the same materials specification.

As used herein the term "dry mix" means a storage stable powder containing gypsum, cellulose ether, any polymeric additive, and any fillers and dry additives. No water is present in a dry mix; hence it is storage stable.

As used herein the term "DS" is the mean number of alkyl substituted OH groups per anhydroglucose unit in a cellulose ether, as determined by the Ziesel method. The term "Ziesel method" refers to the Ziesel Cleavage procedure for determination of MS and DS. See G. Bartelmus and R. Ketterer, *Zeitschrift fuer Analytische Chemie*, Vol. 286 (1977, Springer, Berlin, DE), pages 161 to 190.

As used herein the term "low or medium viscosity crosslinked cellulose ether" means a crosslinked cellulose ether which, absent crosslinking, would have a viscosity of from 10000 to 40000 mPas measured as a 2 wt. % solution in water using a Haake Rotovisko™ RV 100 rheometer (Thermo Fisher, Scientific, Karlsruhe, DE) at 20° C. and a shear rate 2.55 s$^{-1}$.

As used herein the term "high viscosity crosslinked cellulose ether" means a crosslinked cellulose ether which, absent crosslinking, would have a viscosity of more than 40,000 mPas measured as a 2 wt. % solution in water using a Haake Rotovisko™ RV 100 rheometer (Thermo Fisher, Scientific, Karlsruhe, DE) at 20° C. and a shear rate 2.55 s$^{-1}$.

As used herein the term "MS" is the mean number of moles of etherification reagent which are bound as ether per mol of anhydroglucose unit as hydroxyalkyl substituents in a cellulose ether, as determined by the Ziesel method. The term "Ziesel method" refers to the Ziesel Cleavage procedure for determination of MS and DS. See G. Bartelmus and R. Ketterer, *Zeitschrift fuer Analytische Chemie*, Vol. 286 (1977, Springer, Berlin, DE), pages 161 to 190.

As used herein the term "wt. % of total solids" means the weight of a given composition based on the total weight on non-volatile ingredients in the composition, determined by volatility at ambient temperature and pressure. Volatiles include water, solvents that evaporate under conditions of ambient temperature and pressure, like methyl ethyl ketone, and gases, like ammonia.

Surprisingly, it has been found that the use of crosslinked cellulose ethers containing polyether groups in the crosslinker, preferably cellulose ethers containing alkyl ether and hydroxyalkyl groups, significantly improves the workability behavior of gypsum compositions in terms of reduced mortar stickiness. In addition, the present invention enables the reduction of cellulose ether dosage by more than 20% without compromising product and application performance through the use of the inventive crosslinked ethers which have enhanced gel strength characteristics, such as, at a given concentration, a greater degree of thickening or viscosity in the elastic static relative to the same thing measured in the viscous state.

Suitable cellulose ethers for use in the methods to make the crosslinked polyether group containing cellulose ethers of the present invention may include, for example, a hydroxyalkyl cellulose or an alkyl cellulose, or a mixture of such cellulose ethers. Examples of cellulose ether compounds suitable for use in the present invention include, for example, methylcellulose (MC), ethyl cellulose, propyl cellulose, butyl cellulose, hydroxyethyl methylcellulose (HEMC), hydroxypropyl methylcellulose (HPMC), hydroxyethyl cellulose ("HEC"), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). Preferably, the cellulose ethers are mixed cellulose ethers that contain hydroxyalkyl groups and alkyl ether groups, such as alkyl hydroxyethyl celluloses, such as hydroxyalkyl methylcelluloses, for example, hydroxyethyl methylcellulose (HEMC), hydroxypropyl methylcellulose (HPMC), methyl hydroxyethyl hydroxypropylcellulose (MHEHPC), and ethylhydroxyethyl cellulose (EHEC).

In the cellulose ethers of the present invention, alkyl substitution is described in cellulose ether chemistry by the term "DS", as determined by the Ziesel method. The DS is the mean number of substituted OH groups per anhydroglucose unit. The methyl substitution may be reported, for example, as DS (methyl) or DS (M). The hydroxy alkyl substitution is described by the term "MS", as determined by the Ziesel method. The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Z. *Anal. Chem.* 286 (1977), 161-190).

A crosslinked HEC preferably has a degree of substitution MS (HE) of 1.5 to 4.5, in particular a degree of substitution MS (HE) of 2.0 to 3.0.

Preferably, mixed ethers of methyl cellulose are used for the crosslinking. In the case of HEMC, a preferred DS (M) values ranges from 1.2 to 2.1 or, more preferably, from 1.3 to 1.7, or, even more preferably, from 1.35 to 1.60, and MS (HE) values range from 0.05 to 0.75, or, more preferably, from 0.15 to 0.45, or, even more preferably, from 0.20 to 0.40. In the case of HPMC, preferably, DS (M) values range from 1.2 to 2.1, or, more preferably, from 1.3 to 2.0 and MS (HP) values range from 0.1 to 1.5, or, more preferably, from 0.2 to 1.2.

Crosslinking agents suitable for use in the present invention may include compounds having a polyoxyalkylene or polyalkylene glycol group and two or more, preferably, two crosslinking groups, such as halogen groups, glycidyl or epoxy groups, or ethylenically unsaturated groups, e.g. vinyl groups, that form ether bonds with the cellulose ether in crosslinking the cellulose ether.

Suitable bifunctional compounds may be chosen from, for example, 1,2-dichloro (poly)alkoxy ethers, dichloropolyoxyethylene, diglycidyl polyalkoxy ethers, diglycidyl phosphonate, divinyl polyoxyalkylenes containing a sulphone group. Compounds which bear two different functional groups can also be used. Examples of these are diglycidyl polyoxypropylenes and glycidyl(poly)oxyalkyl methacrylate.

The amount of crosslinking agent used may range from 0.0001 to 0.05 eq, where the unit "eq" represents the molar ratio of moles of the respective crosslinking agent relative to the number of moles of anhydroglucose units (AGU) of the cellulose ether. The preferred amount of crosslinking agent used is 0.0005 to 0.01 eq, or, more preferably, the amount of crosslinking agent used is 0.001 to 0.005 eq.

The methods for crosslinking cellulose ether to make the polyether group containing cellulose ethers of the present invention may take place by crosslinking the cellulose ethers in the reactor in which the cellulose ether itself is made and in the presence of caustic or alkali. Thus, the crosslinking reaction is generally conducted in the process of making a cellulose ether.

Because the process of making a cellulose ether comprises stepwise addition of reactants to form the ether groups, preferably, the crosslinking of the cellulose ethers precedes one or more addition of alkyl halide, e.g. methyl chloride, in the presence of alkali to form alkyl ethers of the cellulose.

Further, so that the cellulose ethers are not degraded or broken down in processing, the crosslinking reaction is carried out in an inert atmosphere and at temperatures of 90° C. or less, or, preferably, at as low a temperature as is practicable.

After the polyether group containing cellulose ethers of the present invention are made, they are granulated and dried. Granulation may follow dewatering or filtering to remove excess water, if needed.

The gypsum dry mix compositions are formed by mixing all of the materials of the present invention in dry form In general, there are two types of gypsum mortars: 1) drying and 2) setting or hemihydrate containing compositions. Both generally comprise gypsum and may further comprise one or more filler. In accordance with the present invention, setting gypsum is preferred and, more preferably, comprises phosphate gypsum.

Drying gypsum compositions may be provided as ready-to-use dry mix compositions and calcium carbonate or limestone is the predominant inorganic binder. For storage, water can be mixed in with the inorganic filler as a separate component from the gypsum as the water does not react with the inorganic binder. Upon application, water is admixed with the dry mix composition and the water evaporates to the atmosphere.

Setting compositions can be sold as a dry mix powder and water must not be added until used at the job site or else the dry mix blocks up in the package and becomes useless. The primary inorganic filler is calcium sulfate hemihydrate and the water does react with the filler, thus, the term setting. Preferably, the composition of the present invention is a drying composition and is a tape joint or gypsum smoothing compound (liquid) composition or a dry mix composition.

The dry mix compositions of the present invention comprise gypsum in an amount not less than 40 wt. %, preferably, 60 wt. % or more, based on the total dry weight of the compositions. Such compositions can be machine plasters or gypsum lime plasters.

Suitable gypsum sources can be natural gypsum and synthetic gypsum, such as phosphorous gypsum. Phosphorous gypsum refers to gypsum formed as a by-product of the production of fertilizer from phosphate rock.

A suitable particle size distribution for gypsum is from 65-75%<0.063 mm for phosphorous gypsum and 35 to 55%, for example, 45-55%<0.063 mm for natural gypsum, all particle sizes determined by air jet sieving, 5 min @ 2000 Pa (low) pressure.

To increase their length of application time, the compositions of the present invention may comprise one or more gypsum retarders, such as carboxylic or polycarboxylic acids or their salts, like citric acid, or, preferably, tartaric acid, as well as phosphates, such as tetrapotassium diphosphate, phosphonates, and phosphonic acids and borates. The amount used ranges from 0.01 and 0.2 wt. %, based on total gypsum solids, and depends on the setting time to be achieved, with more increasing pot life, as well as the efficiency of the retarder.

The dry mix compositions may comprise one or more air entraining agent, such as sodium alkyl sulfates, e.g. sodium lauryl sulfate, olefin sulfonates or ethoxylated fatty alcohols.

The compositions of the present invention can include inorganic fillers. The level of inorganic filler ranges from 0 to 40 wt. %, preferably from 5 to 25 wt. %, based on the weight of a dry mix or wt. % of total solids used to make anaqueous mortar or compound.

The predominant inorganic filler may be calcium carbonate, usually derived from limestone. Other inorganic fillers that can be used include gypsum (predominantly calcium sulfate dihydrate), mica, clay, expanded perlite, and talc.

The dry mix compositions of the present invention may further include an emulsion polymer binder formed by an aqueous emulsion polymerization method in a solid form as a water redispersible polymer powder. Aqueous emulsion polymers may be selected from various compositional classes such as, for example, vinyl acetate polymers, vinyl acetate-acrylic copolymers, vinyl acetate-ethylene copolymers, acrylic polymers, styrene-butadiene copolymers, and blends thereof.

Other ingredients such as biocides, additional organic or inorganic thickening agents and/or secondary water retention agents, anti-sag agents, air entraining agents, wetting agents, defoamers, dispersants, calcium complexing agents, water repellents, biopolymers, fibres or surfactants may be included in the dry mix compositions of the present invention. All of these other ingredients are known in the art and are available from commercial sources. Such additional additives may also be mixed with the gypsum-free mixture of the present invention.

A suitable gypsum machine plaster in accordance with the present invention may comprise from 60.000 to 85.000 wt. %, preferably, from 70 to 80 wt. % of total solids, of a hemihydrate of gypsum, from 15.000 to 40.000 wt. % of total solids, preferably 20 to 30 wt. % of multiphase gypsum, from 0 to 7 wt. % of total solids, for example, from 1.500 to 5.000 wt. % of lime hydrate, from 0 to 1, or from 0.300 to 0.800 wt. % of total solids of perlite (0 to 1 mm particle size, bulk density 60 to 80 g/L), from 0 to 0.05, or from 0.015 to 0.030 wt. % of total solids of an air entraining agent, such as sodium lauryl sulfate, from 0.040 to 0.060 wt. % of total solids of one or more retarder, from 0.010 to 0.050 wt. % of total solids of a starch ether, and at least 0.1 wt. % of total solids of the polyether group containing crosslinked cellulose ether.

A suitable lightweight gypsum machine plaster may comprise from 60.000 to 85.000 wt. %, preferably, from 70 to 80 wt. % of total solids, of a hemihydrate of gypsum, from 15.000 to 40.000 wt. % of total solids, preferably 20 to 30 wt. % of multiphase gypsum, from 0 to 7 wt. % of total solids, for example, from 2.00 to 5.000 wt. % of lime hydrate, from 0 to 1.5, or from 0.600 to 1.200 wt. % of total solids of perlite (0 to 1 mm particle size, bulk density 60 to 80 g/L), from 0 to 0.05, or from 0.01 to 0.030 wt. % of total solids of an air entraining agent, such as sodium lauryl sulfate, from 0.025 to 0.1 wt. % of total solids of one or more retarder, from 0.200 to 0.300 wt. % of total solids of a calcium sulphate dihydrate, from 0.00 to 0.050 wt. % of total solids of a starch ether, and at least 0.1 wt. % of total solids of the polyether group containing crosslinked cellulose ether.

A machine applied lime plaster may comprise from 40.000 to 50.000 wt. %, of a hemihydrate of gypsum, from 0.000 to 10.000 wt. % of total solids, of multiphase gypsum, from 3 to 20 wt. % of total solids of lime hydrate, from 20 to 35.0 wt. % of total solids of crushed limestone sand (0 to 0.6 mm), from 0.800 to 1.500 wt. % of total solids of perlite (0 to 1 mm particle size, bulk density 60 to 80 g/L), from 0.015 to 0.030 wt. % of total solids of an air entraining agent, such as sodium lauryl sulfate, from 0.030 to 0.060 wt. % of total solids of one or more retarder, from 0.100 to 0.200 wt. % of total solids of a calcium sulphate dihydrate, from 0.010 to 0.030 wt. % of total solids of a starch ether, and at least 0.1 wt. % of total solids of the polyether group containing crosslinked cellulose ether.

The compositions of the present invention find use as gypsum plasters.

EXAMPLES

The following materials were used.

Phosphorous gypsum dry powder (a mixture of hemihydrate gypsum, multiphase gypsum & perlite (Engis, BE), containing, as indicated, air-entrainment agents, retarders and other additives, such as starch ethers.

The phosphorus gypsum material was mixed with 4% wt. lime hydrate, 0.025% wt. sodium lauryl sulfate, 0.05% wt. tartaric acid, 0.035% wt. starch ether and 0.25% wt. cellulose ether. The resulting material was used as a dry mix powder.

Unless otherwise indicated, the hydroxyethyl methylcellulose (HEMC) cellulose ether used was that available as WALOCEL™ MKX 40,000 PP01 cellulose ether (Dow, Midland, Mich.). Viscosity of a 2% aq. solution is 40,000 to 50,000 mPas, Haake Rotovisko RV 100, shear rate 2.55 s$^{-1}$, 20° C.

Epilox™ M985 poly(propyleneglycol) diglycidylether crosslinker (Leuna-Harze GmbH, Leuna, DE) is a linear poly(propyleneglycol) diglycidylether made from polypropylene glycol (PPG) having a molecular weight of ~400 daltons and having the formula below;

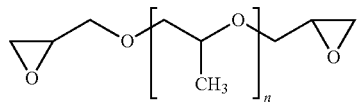

wherein n is 5.7-6.7.

Synthesis Example 1

Ground cellulose flock (1.5 mol) was added to a 5 L autoclave. After purging the autoclave trice with nitrogen gas, the reactor is heated to 40° C. Then dimethylether (DME, 4.7 mol/mol AGU), and methyl chloride (MCl 1; 3.2 mol/mol AGU) were injected into the autoclave. Caustic soda (NaOH, strength 50 wt. % aqueous, 1.9 mol NaOH/mol AGU) was added in 3 portions during 2 minutes at a temperature of 40° C. The reaction mixture was held at 40° C. for 30 minutes. Ethylene oxide (0.45 mol/mol AGU) was then added and the reaction mixture was held for 10 min at 40° C.

Then the amount of crosslinker (Epilox™ M985 crosslinker) specified in Table 1, below, (from 0 to 0.0025 mol crosslinker/mol AGU) was dissolved in 20 ml isopropanol and added to the cellulose ether (HEMC) product in six increments in 30 second intervals. Using this poly(propyleneglycol) diglycidylether crosslinker, no additional reaction time other than dosage time was required to crosslink the cellulose ether.

The mass was heated to 80° C. in 45 minutes. At 80° C. MCL 2 (1.3 mol/mol AGU) is injected quickly to the mass. Afterwards, NaOH (0.67 mol/mol AGU) was added in 7 portions over 30 minutes followed by a 70 minute cook-off time at 80° C. Following this, the product was washed in hot (>95° C.) water, neutralized with formic acid, granulated, dried and milled.

Cellulose ethers were tested and characterized as discussed below in the form of aqueous solutions and, as well, in gypsum mortars having the indicated compositions.

Gypsum mortars in tests discussed below contained the above mentioned gypsum dry mix composition of 95.6 wt. % of a phosphorous gypsum material, having a particle size of 73%<0.063 mm as determined by air jet sieving. Each indicated cellulose ether was added as an aqueous solution to eliminate the influence of different cellulose ether particle sizes or particle size distributions on the stickiness. To make the aqueous solutions, the indicated cellulose ethers were added to water as needed to arrive a final water/solid weight ratio of 0.55; the water/solid ratio of 0.55 was kept constant for all experiments. Each cellulose ether aqueous solution was added to phosphorous gypsum dry mix material in the amount of indicated in Table 2, below, as a wt. % of total solids.

Rheology Test Methods:

Loss Factor at Yield Point (Tan δ):

A rheological oscillation test was run with each gypsum mortar to measure the ratio of loss modulus (G") to shear storage modulus (a) to get the loss factor (tan δ=G"/G'), or a loss factor (tan δ) taken at the yield point of the gypsum mortar. The yield point itself is the point at, and beyond which, the gypsum mortar becomes viscous. The tan δ is a function of plaster stickiness; thus, a lower tan δ value indicates less stickiness of a given material; the lower the tan δ, the better. The indicated materials containing cellulose ether and phosphorous gypsum dry mix material were mixed in a Z2-DIN-beaker using a Krups 3 (speed) Mix 3003 mixer (Krups GmbH, Solingen, DE) for 15 s at mixer level 1 and then an additional 45 s at mixer level 3. The test was run with each gypsum mortar at 20° C. using a Universal Dynamic Spectrometer™ UDS 200 rheometer (Physica Messtechnik GmbH, Stuttgart, DE). In the test, the indicated gypsum mortar and the indicated cellulose ether was filled into a cylinder and deformed in an oscillatory fashion with a vane spindle at a shear flow at 2 Hz. The measurement followed the method described in the literature of Baumann, R. et al., "Controlling the application performance of cement renders with cellulose ethers, ZKG 4 2010, ZKG (Cement Lime Gypsum) International, Bauverlag BV, GmbH, Gutersloh, DE, pp 68-75. The phosphorous gypsum plaster was subjected to a sweep of the stress amplitude from 0-1500 Pa.

The tan δ stickiness of the crosslinked cellulose ethers of the present invention was tested in the indicated gypsum mortar compositions and, as a compared with the tan δ of the same amount of the same cellulose ether, absent crosslinking, in the same gypsum mortar composition. Results are shown in Table 2, below.

Gel Strength or n/m:

A rheological oscillation test was run with the indicated cellulose ethers as a 1.5 wt. % aqueous solution in the manner described in U.S. patent pub. no. 2004/0127700A1 at pages 2 and 3, paragraphs [0035]-[0044], page 6, paragraphs [0095] to [0105]). The test was run with each cellulose ether solution at 20° C. room temperature using a Universal Dynamic Spectrometer™ UDS 200 rheometer (Physica Messtechnik GmbH, Stuttgart, DE). In this test, the cellulose ether solution has an enhanced gel strength if n/m is between 0.8 and 1.2.

In the test, a vane spindle was used and, its angular frequency (ω) in rad/s was changed in such a manner that there were in total 6 measured points in the range of (ω) from 0.1 to 1. The storage modulus (G') and loss moduls (G") in Pascal were measured as a function of angular frequency (ω). In a logarithmic plot of modulus in Pascal versus angular frequency (ω), where n and m are, respectively, the slope of a line defined by log G' and the slope of a line defined by the log G", the value of n/m corresponds to the gel strength of the cellulose ether.

Measurements of storage modulus (G') and loss moduls (G") in Pascal and angular frequency (ω) for the various cellulose ethers tested in the Examples are given in Tables A-1 to A-2, below.

TABLE A-1

Gel Strength of Hydroxyethyl Methyl Cellulose Ether (HEMC)
Example 1*

| log ω | log G' | log G" |
|---|---|---|
| 0 | 1.06069784 | 1.2764618 |
| −0.19997064 | 0.88195497 | 1.15533604 |

TABLE A-1-continued

Gel Strength of Hydroxyethyl Methyl Cellulose Ether (HEMC)
Example 1*

| log ω | log G' | log G" |
|---|---|---|
| −0.40011693 | 0.6919651 | 1.02938378 |
| −0.60032628 | 0.48572143 | 0.88817949 |
| −0.80134291 | 0.26717173 | 0.74193908 |
| −1 | 0.04532298 | 0.57634135 |
| slope | 1.0176 | 0.6970 |
| R: | 0.9982 | 0.9967 |
| n/m | | 1.46 |

*Denotes Comparative Example

TABLE A-2

Gel Strength of Cellulose Ethers
Example 3

| log ω | log G' | log G" |
|---|---|---|
| 0 | 1.478566496 | 1.42488164 |
| −0.199970641 | 1.411619706 | 1.32221929 |
| −0.400116928 | 1.336459734 | 1.26007139 |
| −0.600326279 | 1.235528447 | 1.17318627 |
| −0.801342913 | 1.146128036 | 1.09342169 |
| −1 | 1.041392685 | 0.99694925 |
| slope | 0.4402 | 0.4159 |
| R: | 0.9940 | 0.9968 |
| n/m | | 1.06 |

The ratio n/m (gel strength) is reported in Table 1, below. As shown in Table 1, the ratio (n/m) of the inventive polyether group containing crosslinked cellulose ethers is in the desired range of from 0.8 to 1.2. The gel strength of the inventive polyether group containing crosslinked cellulose ethers is greater than that of the same cellulose ether in comparative Example 1 that is not crosslinked. This is surprisingly the case even with the very slight degree of crosslinking.

TABLE 1

Crosslinked Cellulose Ether Compositions

| | EXAMPLE | | |
|---|---|---|---|
| | 2 | 3 | *1 (HEMC) |
| Crosslinker (mol/mol) | 0.0025 | 0.0025 | 0.0000 |
| V[1] mPa · s | 4888 | 5367 | 4370 |
| DS(M) | 1.51 | 1.49 | 1.59 |
| MS(HE) | 0.22 | 0.24 | 0.32 |
| Gel Strength or Ratio n/m[2] | 1.20 | 1.06 | 1.46 |

[1]V = Viscosity of a 1 wt. % in water, Haake Rotovisko RV 100 rheometer, shear rate 2.55 s[−1], 20° C.;
*Denotes Comparative Example.

TABLE 2

Tan δ Values for Cellulose Ethers In Gypsum Mortar

| Example | Cellulose Ether Addition Rate (%) | tan δ[1] |
|---|---|---|
| 1* HEMC from Table 1 | 0.25 | 0.52 |
| 1* HEMC from Table 1 | 0.19 | 0.51 |

TABLE 2-continued

Tan δ Values for Cellulose Ethers In Gypsum Mortar

| Example | Cellulose Ether Addition Rate (%) | tan δ[1] |
| --- | --- | --- |
| 2 from Table 1 (invention) | 0.19 | 0.45 |
| 3 from Ex. 3, Table 1 (invention) | 0.19 | 0.42 |

[1]standard deviation <1%;
*denotes Comparative Example.

As shown in Table 2, above, at an amount of 0.19 wt. %, a comparative cellulose ether (HEMC) gives a tan δ value (within margin of error) of about 0.51. Using the same amount of an inventive crosslinked cellulose ether (CL HEMC) in Examples 2 and 3 significantly decreased the tan δ values. Accordingly, the inventive gypsum mortar has a much lower stickiness compared to the comparative gypsum mortar containing HEMC, and gives acceptable stickiness in a phosphorous gypsum containing mortar. It was not expected that a phosphorous gypsum mortar would give acceptable smooth running application characteristics like a gypsum mortar containing a natural gypsum source.

We claim:

1. A dry mix composition for use in making gypsum plasters or mortars having reduced stickiness comprising gypsum, one or more retarder, and one or more crosslinked cellulose ethers containing polyether groups in an amount of from 0.1 to 0.4 wt. % of total solids.

2. The dry mix composition as claimed in claim 1, wherein the gypsum comprises from 20 to 100 wt. %, based on the total weight of gypsum solids, of a phosphorous gypsum.

3. The dry mix composition as claimed in claim 1, wherein the amount of the gypsum ranges from 60 to 99.7 wt. % of total solids in any composition other than a lime plaster and wherein, in lime plaster, the amount of the gypsum ranges from 40 to 96.7 wt. % of total solids and the amount of lime ranges from 3 to 20 wt. % of total solids.

4. The dry mix composition as claimed in claim 1, wherein at least one of the one or more crosslinked cellulose ethers is a mixed cellulose ether that contains hydroxyalkyl groups and alkyl ether groups.

5. The dry mix composition as claimed in claim 1, wherein the polyether group in the one or more crosslinked cellulose ethers is a polyoxyalkylene which has from 2 to 100 oxyalkylene groups.

6. The dry mix composition as claimed in claim 1, wherein the polyether group in the one or more crosslinked cellulose ethers is a polyoxyalkylene which has from 2 to 20 oxyalkylene groups.

7. The dry mix composition as claimed in claim 1, wherein the polyether group in the one or more crosslinked cellulose ethers is a polyoxyalkylene chosen from a polyoxyethylene, a polyoxypropylenes and combinations thereof.

8. The dry mix composition as claimed in claim 1, wherein the one or more crosslinked cellulose ethers is a polyoxypropylene group containing hydroxyethyl methylcellulose.

9. The dry mix composition as claimed in claim 1, wherein the amount of the one or more retarder ranges from 0.02 to 0.1 wt. % of total solids.

10. A method of using the dry mix composition as claimed in claim 1, comprising combining the dry mix composition with water or aqueous liquid to make a mortar and applying the mortar to a substrate and letting the applied mortar dry.

* * * * *